Feb. 18, 1930. E. R. JACOBI ET AL 1,747,474
TIE AND DRIVE FOR DEMOUNTABLE RIMS
Filed June 1, 1926 4 Sheets-Sheet 1
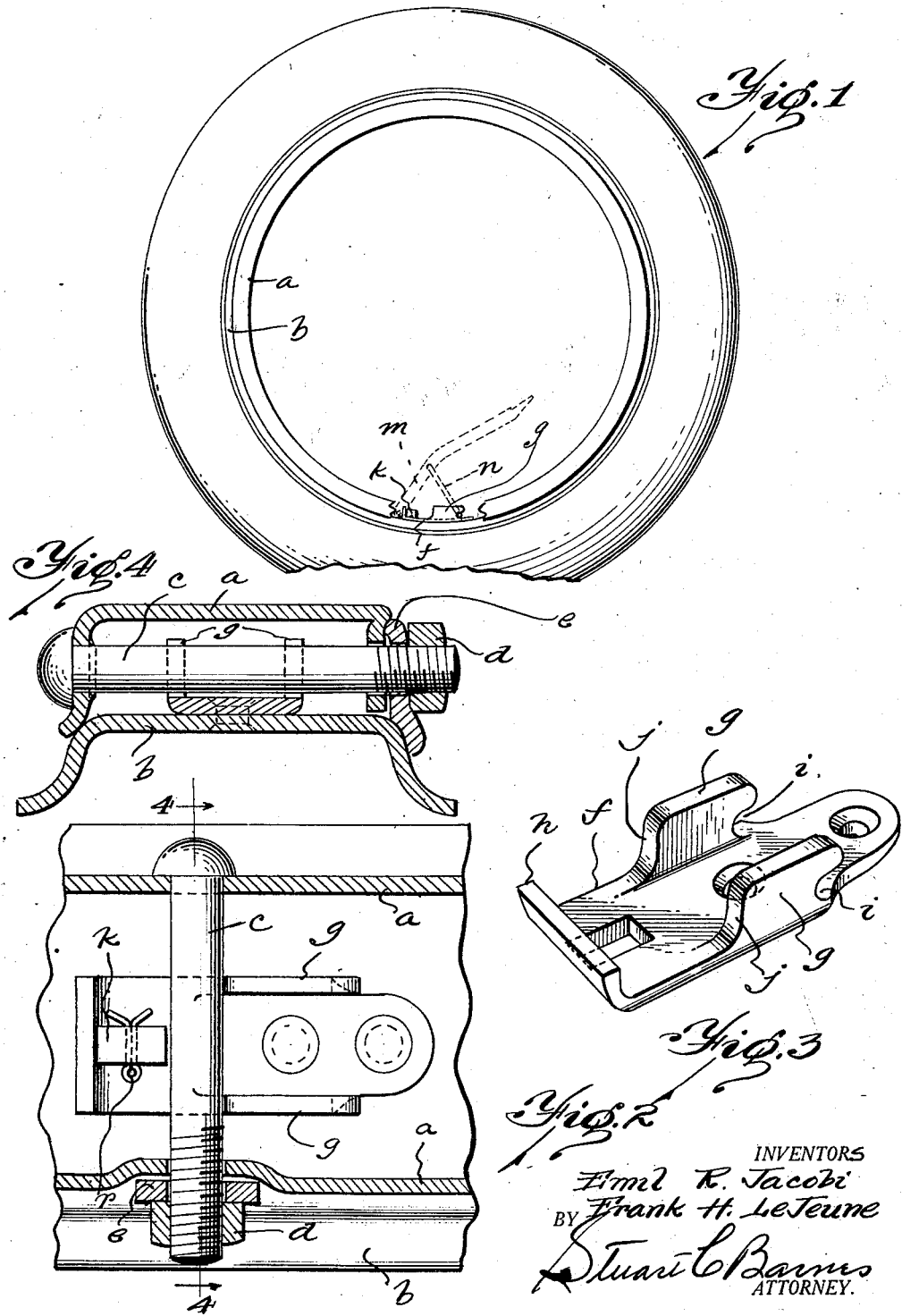
INVENTORS
Emil R. Jacobi
Frank H. LeJeune
BY Stuart C. Barnes
ATTORNEY.

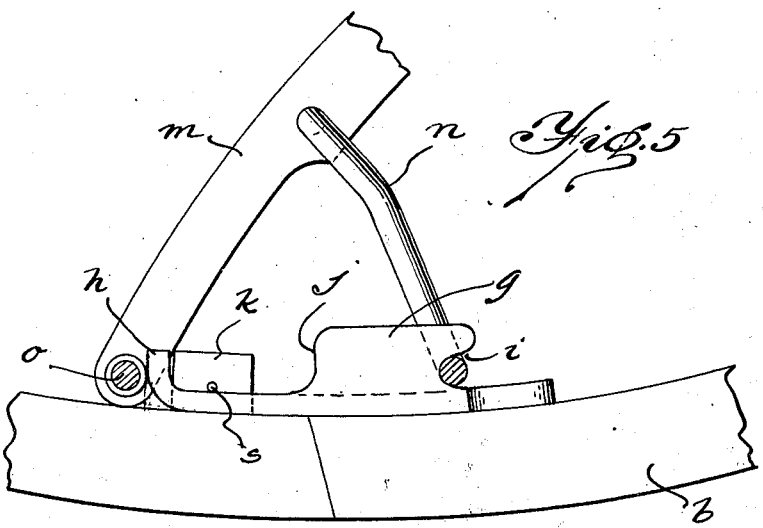
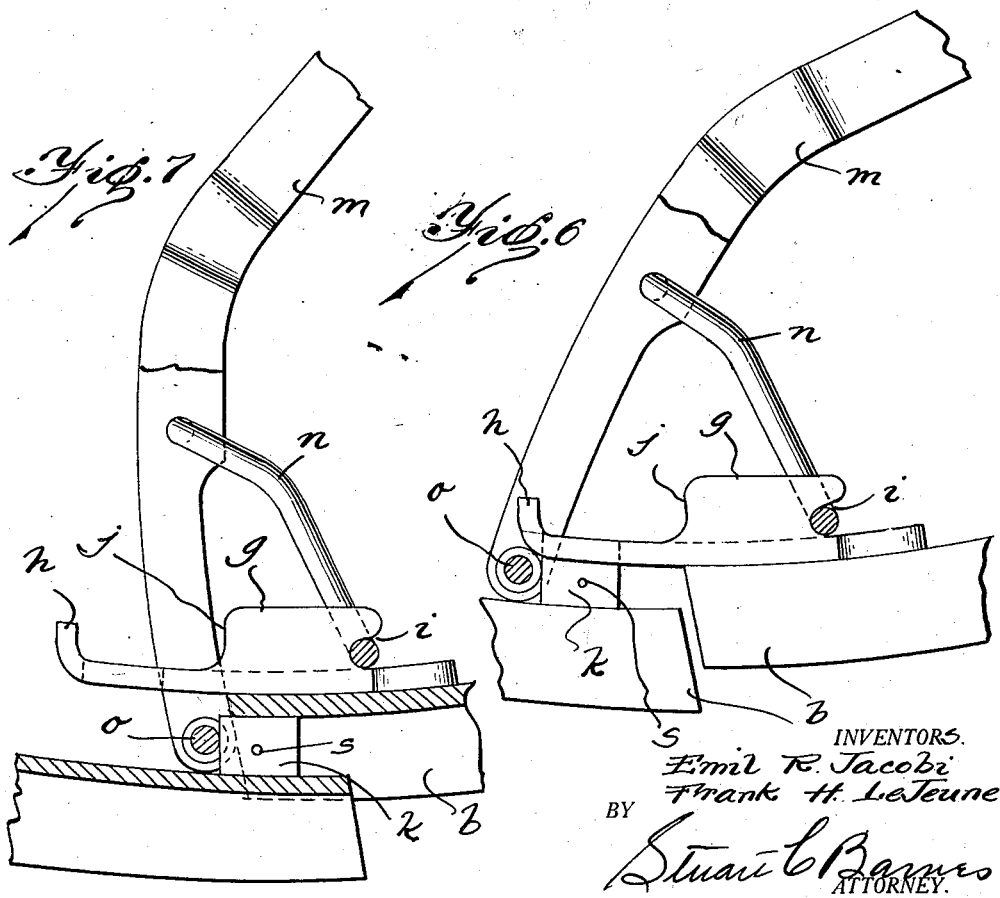

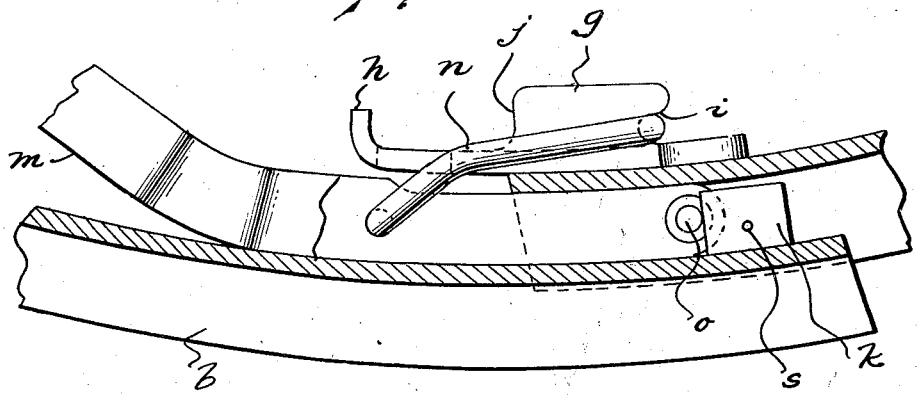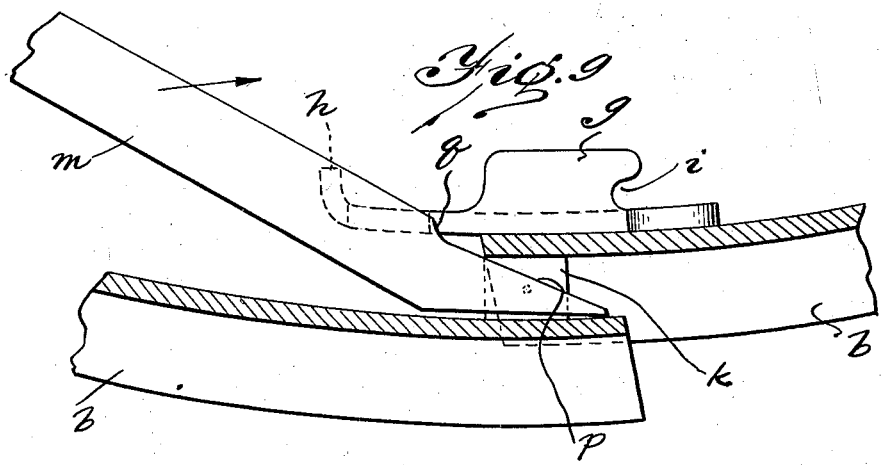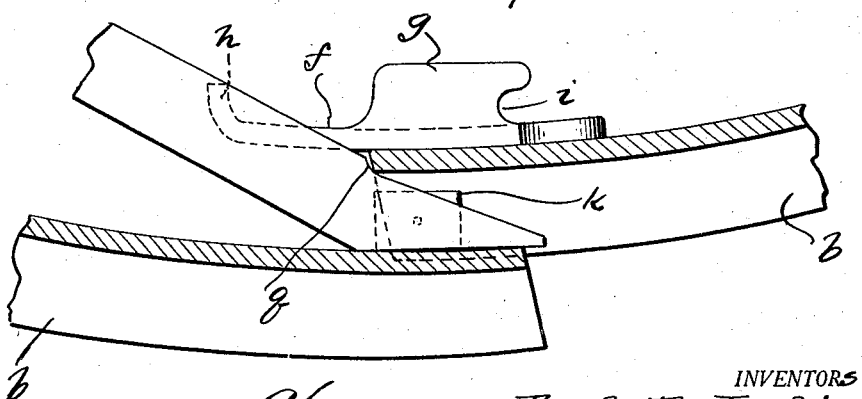

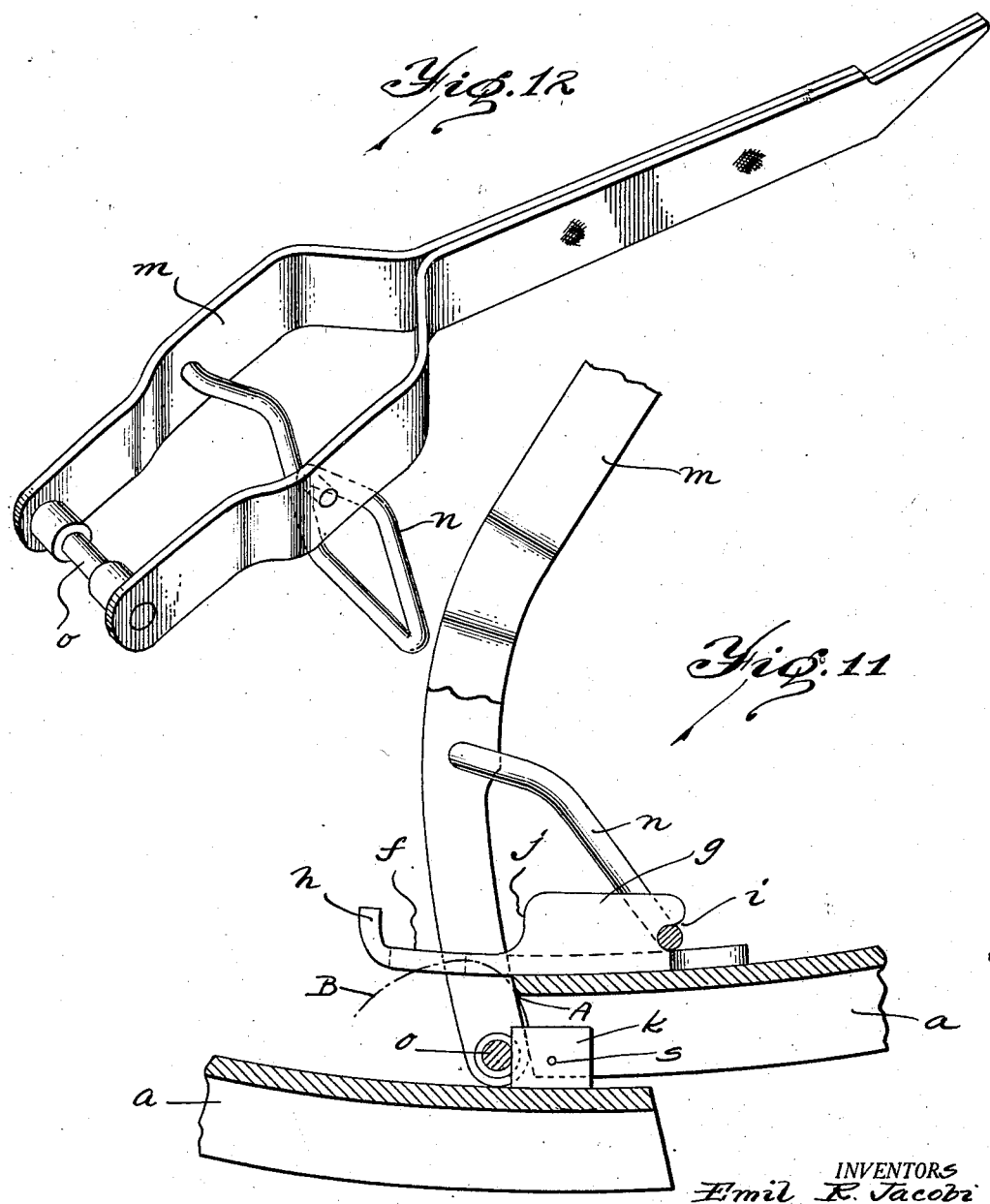

Patented Feb. 18, 1930

1,747,474

UNITED STATES PATENT OFFICE

EMIL R. JACOBI AND FRANK H. LE JEUNE, OF JACKSON, MICHIGAN, ASSIGNORS, BY MESNE ASSIGNMENTS, TO KELSEY-HAYES WHEEL CORPORATION, OF DETROIT, MICHIGAN, A CORPORATION OF NEW YORK

TIE AND DRIVE FOR DEMOUNTABLE RIMS

Application filed June 1, 1926. Serial No. 113,066.

This invention relates to demountable rims, and is more especially directed to a tie plate which has the additional functions of being both a driver and a device for the application of a rim-contracting tool.

We are aware that it is not broadly new to provide a device which has these several functions, but we believe that our device is an improvement in the way of economy in manufacture, effectiveness as a tie and driver, and adaptability for a rim-contracting tool. This will be more fully explained as the detailed construction is described.

In the drawings:

Fig. 1 is a side elevation of a tire and rim showing the application of the tool.

Fig. 2 is a plan view of the tie device, showing how it acts as a driver.

Fig. 3 is a perspective of the tie plate itself.

Fig. 4 is a cross section taken on the line 4—4 of Fig. 2.

Figs. 5, 6, 7, 8 and 11 are fragmentary elevational and sectional views showing the rim tool and the parts in the several positions in collapsing the rim.

Figs. 9 and 10 are similar views showing how the opposite end of the rim tool is used to pry the ends of the rim back to their locking position.

Fig. 12 is a perspective of the rim tool.

$a$ designates the fixed rim; $b$ the demountable rim; the fixed rim is provided with the usual bolts $c$. These bolts take the nuts $d$ which may be used to bear against the clamping lugs $e$. However, the loose lugs are simply shown as one form of securing device, for obviously the attached lug type could be equally well used, but in such a case the driver feature of the tie device would not be needed.

A tie plate $f$ in the form of a stamping made of scrap steel, is provided with a rounded up end or flange $h$ and a pair of lateral ears $g$, which are under-cut at their outer ends to provide the tool-receiving gullets $i$. Their inner ends $j$ are curved to fit over the bolts $c$ and in connection with a stud $k$ to form a straddler for the bolt, which effects the driving connection between the demountable rim and the fixed rim. Such a driving connection is ordinarily necessary with loose lug construction.

A tire contracting tool such as shown in Fig. 1, is arranged to co-operate with the rim end fastening device. This is nicely shown in Figs. 5 to 10 inclusive. The tool comprises a bifurcated lever $m$ and a swinging loop $n$. The ends of the lever are connected by a strut rod or fulcrum $o$. Referring to Fig. 5, the loop $n$ hooks in the gullets $i$ while the strut rod $o$ bears against the turned up end $h$ of the tie plate. Pulling up on the lever $m$, this lever fulcrums on the ends of the loop $n$ and acts as a lever of the first order, and the strut rod $o$ is the load end which is driven in under the turned up end $h$ of the tie plate. This forces the strut rod in under the tie plate and against the stud $k$ as shown in Fig. 6. Thereupon the character of the lever changes. The strut rod $o$ now becomes the fulcrum member and the load is transferred to the loop. Further lifting of the lever lifts the tie plate end of the rim, forces it off the stud $k$ and starts to lift this end of the rim over the stud, as is clearly shown in Fig. 7. In this lifting action one has to overcome the resistance of the rim, which tends to resist such distortion. However, in forcing the tool into the position against the demountable rim shown in Fig. 9, the load is forced to ride up the face of the tool, as shown in 11 as A and is thrown over a center, or a point of maximum distortion of the rim that appears to be shortly after the loop and gullet pass over the rim radius, which passes through the fulcrum of the lever. Apparently here the tool allows the rim end to drop back towards the other rim end and the rim reaches the extreme of distortion, being carried radially inward further than at any other point in the action of the lever. Therefore, after passing this point while it is caused to overlap the other end of the rim more, nevertheless the actual distortion of the rim is less and consequently the rim itself will force the lever down and keep it in locked position.

To re-expand the rim, the lever is pulled back over the center until the tie plate end of the rim rests on the top of the stud, as shown in Fig. 9. The end of the rim has gone over to the opposite side of this center of distortion, and consequently will rest on the end of the stud without liability of flying off. The lever is then reversed and the handle end of the same, which is beveled as at *p*, and shouldered as at *q*, is placed between the rim ends and the same applied along the pinch bar principle. One or two efforts and the end will be forced along the top of the stud as this is the tendency anyway, due to the fact that the rim ends are under stress and distorted. Fig. 10 shows how the shoulder *q* comes into play in lifting and forcing the tie plate rim end along. It will immediately then snap over the stud. The rim ends then are sufficiently locked in place but one may make the engagement absolutely reliable by slipping a cotter pin *r* (Fig. 2) into the perforation *s* of the stud.

The tool, and the tool in combination with the tie, is not claimed in this application but in our co-pending application Serial No. 113,067, filed June 1, 1926. The tool is described here for the purpose of exhibiting the value of this particular design of tie and driver, but obviously the tie can be used without the tool and is in itself a valuable improvement, and we believe a novel element. This tie may be disengaged with a screw driver with as much convenience and ease as attends the ordinary collapsing operation. It is, however, especially adapted to act as an element in a combination which includes the tool here shown, and is therefore made the subject of a separate application wherein the claims are directed to the tool and the tool in combination with these tie devices.

Aside from its adaptability for the use of the tool herein described, this tie and driver has advantages and novelty which we will now point out. We appreciate that it is not broadly new in a tie device to have a tie plate snap over a stud. We also appreciate that it is not broadly new to have a tie provided with lugs that are bifurcated to straddle one of the bolts of the fixed rim as a driving device. However, so far as we are aware most tie plates and lug devices have been heretofore so designed that in order to afford the straddling lug they had to be made as castings or forgings. This involves considerable expense over the character of tie and driver exhibited in this application. Here the driver is formed by a combination of lateral ears of one tie member and the stud of the other tie member. This permits the tie plate to be made as a stamping of scrap steel—obviously the cheapest possbile manufacturing proposition. Furthermore, while the inner ends of the lateral ears form a portion of the driver, the opposite ends of the ears are recessed for the reception of a tool. This permits economy in manufacturing, and does not require separate punching or drilling operations for forming a tool-receiving perforation, as is the case in most of the devices of the prior art. The end of the tie is turned up to get a tool under it for prying it off the stud. This may or may not be such a tool as shown and described, for obviously this turned-up end would be useful in the prying action of a screw-driver.

What we claim is:

1. A tie for demountable rims, having in combination with a transversely split rim, a stud secured to one end of the rim, a plate in the form of a member having lateral inwardly extending ears at the sides, and a projecting end provided with a slot arranged to fit over the stud, the stud and two ears forming a bolt-receiving recess to act as a driver, and the extended end of the plate being turned in relative to the rim and having an inclined portion to permit a tool to be forced thereunder.

2. A tie for demountable rims having in combination with a transversely split rim, a stud at one rim end and a tie plate secured to the other rim end having an apertured portion projecting therebeyond to engage over the stud and provided with a transverse portion at its end inclined adjacent the rim, the transverse portion forming a temporary stop for and facilitating the entrance of a portion of a rim tool between the tie plate and rim, the stud forming a stop and fulcrum for the portion of the rim tool after it has passed under the transverse portion.

In testimony whereof we have affixed our signatures.

EMIL R. JACOBI.
FRANK H. LE JEUNE.